(12) United States Patent
Hartwig

(10) Patent No.: US 11,887,452 B2
(45) Date of Patent: Jan. 30, 2024

(54) SUCTION PARTICLE DETECTION SYSTEM WITH LIGHT GUIDE SYSTEM

(71) Applicant: WAGNER Group GmbH, Langenhagen (DE)

(72) Inventor: Jonas Hartwig, Hannover (DE)

(73) Assignee: Wagner Group GmbH

( * ) Notice: Subject to any disclaimer, the term of this patent is extended or adjusted under 35 U.S.C. 154(b) by 244 days.

(21) Appl. No.: 17/394,756

(22) Filed: Aug. 5, 2021

(65) Prior Publication Data
US 2022/0051538 A1 Feb. 17, 2022

(30) Foreign Application Priority Data
Aug. 12, 2020 (EP) .................... 20190683

(51) Int. Cl.
G08B 17/12 (2006.01)
G01N 15/02 (2006.01)
G01N 15/00 (2006.01)

(52) U.S. Cl.
CPC ......... G08B 17/12 (2013.01); G01N 15/0211 (2013.01); *G01N 2015/0046* (2013.01)

(58) Field of Classification Search
CPC ............... G08B 17/12; G01N 15/0211; G01N 2015/0046
See application file for complete search history.

(56) References Cited

U.S. PATENT DOCUMENTS
2019/0287371 A1* 9/2019 Piech .................. G08B 13/186

FOREIGN PATENT DOCUMENTS
CN 104718435 A * 6/2015 ............... G01F 1/66
EP 3465647 B1 * 7/2020 ......... G01N 15/0205

* cited by examiner

*Primary Examiner* — Curtis A Kuntz
*Assistant Examiner* — James E Munion
(74) *Attorney, Agent, or Firm* — Frank H. Foster; Kremblas & Foster

(57) ABSTRACT

The invention relates to a suction particle detection system (100) for detecting a fire, comprising a fluid line system (200) which opens into one or more monitored areas (i), and having a suction device (230), connected in a fluid-guiding manner to the at least one pipe and/or hose line (210) in order to generate a test fluid flow (240) along the at least one pipe and/or hose line (210), and a light guiding system (300) having one or more local detector modules (320) and designed for the local capture and transmission of scattered light scattered at scattering and/or smoke particles and/or designed for the capture and transmission of transmitted light passing through the scattering and/or smoke particles. In the suction particle detection system (100) at least one light guide (310) is connected to the one or more local detector modules (320) and a central analysis device (110) for evaluation.

15 Claims, 10 Drawing Sheets

SUCTION PARTICLE DETECTION SYSTEM WITH LIGHT GUIDE SYSTEM

The invention relates to a suction particle detection system, in particular suction fire detection system, for detecting and/or locating a fire and/or a fire emergence, comprising a fluid line system having at least one pipe and/or hose line which, via one or more suction openings for the respective removal of a amount of test fluid, opens into one or more monitored areas, and having a suction device, which is connected in a fluid-guiding manner to the at least one pipe and/or hose line in order to generate a test fluid flow along the at least one pipe and/or hose line.

The invention also relates to a method for detecting and/or localizing a fire and/or a fire emergence in one or more monitored areas.

BACKGROUND OF THE INVENTION

For fire detection in or for fire monitoring of rooms and buildings, in addition to simple ceiling smoke detectors, especially also for the monitoring of large halls or building complexes, the use of so-called suction particle detection systems, particularly suction fire detection systems became widely accepted. Such suction fire detection systems, also referred to as suction smoke detectors, comprise a suction device, e.g. a fan, by means of which, continuously, a sufficiently representative amount of test fluid, in particular amount of air, is sucked from a room or area of a building to be monitored, the so-called monitored area. For this purpose, the suction device is integrated in a fluid-guiding manner into a fluid line system, in particular a pipe and/or hose system. The pipe and/or hose system comprises at least one or more pipe and/or hose lines-referred to in technical jargon as "branches"-which open into one or more monitored areas via respective suction openings.

The amounts of test fluid removed from the monitored areas in each case are transported along the pipe and/or tube system as test fluid flow and merge generally centrally in a detector module, in particular a particle detector. Detector modules suitable for suction fire detection systems are a known from the prior art and capture scattering and/or smoke particles contained in the supplied test fluid. Such a particle detector generally has a light emitter, e.g. a light emitting diode (LED), and often a plurality of light receivers, e.g. photodiodes (PD). Scattering and/or smoke particles located in the light beam of the light emitting diode have a light scattering effect. The scattered light component is captured by one or more photodiodes, which are aligned at a corresponding scattered light angle, and converted into a current and/or voltage signal. Since the light emitting diode has to be supplied with current to generate the light beam or the photodiode converts captured scattered light into a current and/or voltage signal, these diodes are so-called active components. The current—and/or voltage signals of the photodiodes are then analyzed or evaluated as fire characteristics for detection of a fire and/or a fire emergence. The central capture of any scattering and/or smoke particles contained in the test fluid enables the simultaneous monitoring of a wide variety of monitored areas, e.g. in a building complex or a large hall. However, it is disadvantageous that, due to the central particle detection, it is not possible to localize the detected fire and/or a fire emergence.

Different methods for localizing fires and/or fire emergences in connection with suction fire detection systems are known from the prior art. Publication WO 93/23736 A1 describes a valve which is provided as a component of a manifold of a pipe structure of a gas suction system with a plurality of suction ports. A total of four pipe lines converge in the manifold, each of which opens into a different area of a building to be monitored, for example. In a normal mode of operation, all four pipe connections are opened and connected in a fluid-guiding manner to a particle detector for detecting smoke present in the sucked-in gas. In order to determine the source of the detected smoke, the pipe connections can be selectively closed by means of the valve.

A similar valve, by means of which smoke captured by a particle detector of a suction smoke detection system can be assigned to a particular pipe line, or to a particular branch of the pipe system, is also known from WO 2015/071409 A1. The valve comprises a plurality of inlet openings through which sucked-in air flows that originates from different pipes. In the event that a particle counter or smoke detector connected to the valve detects that a preset smoke or particle threshold has been exceeded, the individual inlet openings can be closed sequentially with the valve in order to identify the pipe line from which the sucked-in smoke or sucked-in particles originate. The disadvantage of the valves described is that the source of the detected particles or the detected smoke can always only be assigned to a specific pipe line or a specific branch of the pipe line system. If several areas or rooms are monitored by means of a single pipe line via several suction openings, a specific localization of the individual area or room is not possible.

A more specific fire localization can be achieved with the system known from patent EP 1397789 B1. This patent also discloses a fire detection system for detecting and localizing source of fires or gas pollution, in which system pipe lines arranged in respective monitored rooms, and provided with suction openings constantly supply a portion of the room air contained in the monitored rooms to a main detector. The fire detection system also has one magnetic valve at or in the area of a suction opening for each monitored room. The magnetic valves can be opened or closed in response to a detection signal output from the main detector via a controller to locate the source of fire or the source of gas pollution. Although the described arrangement can be used to localize a source of fire even along a single pipe line in a room or area-specific manner or even to assign a source of fire to a specific suction opening, the relatively high time delay until detection of the first smoke by the main detector and the subsequent localization by triggering the individual magnetic valves is disadvantageous. In addition, the magnetic valves are also so-called active, i.e. current-carrying components supplied by their own power source. Active components cannot simply be used in high-risk, radiation-loaded and/or potentially explosive environments (EX environment).

Patent specification EP 1 634 261 B1 discloses a solution for localizing a source of fire by means of a suction fire detection system without magnetic valves. If, in this case, a fire characteristic, for example smoke or particles, is detected by a detector, the runtime is to be measured according to the described method by repeatedly sucking in and intermittently blowing out the air sucked in from the monitored rooms until the detector detects a characteristic fire quantity again. The localization of the location of the fire or the location of the fire emergence is based on the fact that each individual monitored room has a fixed distance from the detector and the sucked-in smoke has a runtime that is dependent on the suction pipe system. With this described solution, too, the initial detection and subsequent localization of a fire or source of fire is only possible with a relatively long delay due to the runtimes of the sucked-in air through the pipe system.

Finally, EP 3 321 908 A1 discloses a (fire) detection system for monitoring electrical components for temperature rise and/or smoke development, which system is based on optical fibers and does not require a fluid line system. Instead of the suction openings opening into the area or room to be monitored in the suction fire detection systems, a so-called node is provided here on or directly within the electrical components to be monitored. A node is designed as a purely passive component, that is, without current-carrying components and essentially consists of the exposed ends of two parallel fibers of an optical waveguide or a fiber optic cable. According to the disclosure, a plurality of nodes can be combined via a glass fiber or optical waveguide bundle and connected in a light-guiding manner to a central control system, which comprises a light source, for example a laser diode and a light receiver, for example a photodiode. In this case, the light source is connected to a first fiber and is emitted into the surrounding atmosphere at the respective node. For example, light scattered at smoke particles is captured at the node via the end of the second fiber and routed along the optical waveguide or fiber optic cable back to the central control system, where the detected light signal is converted into a current and/or voltage signal by means of the photodiode for further evaluation. The disadvantage of the disclosed nodes is that only a locally very limited area can be monitored by means of the optical fiber ends, which is why use for monitoring larger areas, rooms or large halls is not possible. The evaluation options are also limited compared to the highly sensitive scattered light particle detectors used in suction fire detection systems.

SUMMARY OF THE INVENTION

It is therefore an object of the present invention to overcome the disadvantages of the systems for fire detection known from the prior art and to provide an improved suction particle detection system, in particular a suction fire detection system. In particular, a faster detection and/or localization of a fire and/or a source of fire with at the same time error-free and high detection accuracy, as well as an environment-independent use, in particular also in an explosive atmosphere, should be made possible.

The object is achieved by a suction particle detection system according to claim 1 and a method according to claim 11.

A suction particle detection system according to the invention of the type described at the outset in more detail is characterized by a light guiding system having one or more local detector modules, each assigned to at least one suction opening and designed for the local capture and transmission of scattered light scattered at scattering and/or smoke particles present in the respective monitored area and/or the test fluid flow, and/or designed for the capture and transmission of transmitted light passing through the scattering and/or smoke particles, and having at least one light guide that is connected in a light-guiding manner to the one or more local detector modules and a central analysis device for evaluation of the scattered light and/or transmitted light captured and transmitted by each of the one or more local detector modules.

Thus, according to the invention, a suction particle detection system known per se from the prior art, in particular a fire detection system, is supplemented by an additional, in particular redundant fire and/or particle detection, which is implemented by a light guiding system having one or more local detector modules. The local detector modules are each assigned to at least one suction opening of the fluid line system. As a result, the already existing structure of the fluid line system is combined with the one or more local detector modules, as a result of which, as an advantageous effect, the range of the local detector modules, which is locally limited to the immediate surroundings, is considerably increased. By a continuous removal of amounts of test fluid from the monitored area by means of the suction openings, the effective range of a local detector module, for example a detector module arranged in the suction area of a suction opening, can be substantially increased, so that such a module can be used for monitored rooms and/or halls of a building. At the same time, with respect to the particle detection, in particular fire detection, with a suction particle detection system known from the prior art, the time period related to the time of transport of the amounts of test fluid along the pipe and/or hose lines to a possible detection of a fire is significantly reduced. That is to say scattering and/or smoke particles contained in the amount of test fluid that has been removed are detected by the local detector module directly in the area of the one or more suction openings based on scattered light locally captured there and transmitted almost instantaneously to the central analysis device in the form of a scattered light signal and allow a rapid fire detection. In addition, the proportion of scattering and/or smoke particles in the test fluid flow is higher at the local detector module than at the central analysis device, which simplifies detection.

As an alternative to the local detector modules typically designed as scattered light detectors, local detector modules designed as transmitted light detectors can also be used, which accordingly capture the transmitted light passing through the scattering and/or smoke particles and transmit it to the central analysis device. Consequently, scattered light is understood to mean the portion of light scattered at scattering and/or smoke particles, in particular at a certain angle that is captured in the monitored area. The portion of light not scattered at the scattering and/or smoke particles and, in particular, also the portion of light scattered in the forward direction with regard to the direction of incidence of light is correspondingly referred to as transmitted light.

By positioning each of the one or more local detector modules in the area of at least one suction opening of the suction particle detection system, the disadvantages of the fire detection systems known from the prior art can be eliminated without having to forego further advantages thereof, such as high detection accuracy of the suction particle detection system or particularly fast particle or fire detection of a local detector module. At the same time, a redundant and therefore particularly reliable fire detection system is created, in the monitored area of which only passive components are arranged. The combination of a fluid line system with a light guiding system also increases the evaluation options as a result of which interfering signals can be identified more easily, for example.

For the sake of clarity, the invention is basically described below using local detector modules designed as scattered light detectors, but all the explained embodiments of the invention can also be implemented with local detector modules designed as transmitted light detectors or a mixture.

In an advantageous further development of the invention, the one or more local detector modules are each arranged within a flow cross section of the at least one pipe and/or hose line and/or within the test fluid flow.

In this way, a particularly reliable capture of scattering and/or smoke particles can be implemented, since the one or more local detector modules are arranged in the test fluid flow itself, e.g. in the mouth area of a suction opening or even in the fluid line system, in particular a pipe and/or hose line. In the latter case, the pipe and/or hose line can be used as a structural delimitation and/or for mounting the one or more local detector modules. The at least one light guide that is connected to the one or more local detector modules preferably runs parallel to or even within the pipe and/or hose line.

In principle, it is conceivable to implement the invention with a light guide designed as an optical waveguide or glass fiber cable with a single optical fiber. However, an exemplary variant of the invention is particularly advantageous in which the at least one light guide of the light guiding system is designed as an optical waveguide or glass fiber cable having at least one first optical fiber and at least one second optical fiber for transmitting light and/or scattered light between the one or more local detector modules and the central analysis device.

For example, the first optical fiber is provided for transmitting the scattered light captured at the respective local detector module to the central analysis device, whereas the second optical fiber can be provided for transmitting light originating from any light source to the respective local detector modules. In this variant, the one or more local detector modules can operate independently of the light sources present or ambient lighting conditions in the respective monitored area, i.e. they are "supplied" with light via the second optical fiber. At the same time, any captured scattered light and/or transmitted light can be transmitted to the central analysis device via the first optical fiber. For quick localization of a detected fire and/or a fire emergence a first and a second optical fiber are assigned to each local detector module. All of the first and all of the second optical fibers together are referred to as light guides.

In a further development of this variant of the invention, the one or more local detector modules each have a first fiber end of a first optical fiber and a second fiber end of a second optical fiber, the first fiber end of the first optical fiber and the second fiber end of the second optical fiber being aligned with one another at an angle that can be chosen as required.

Via the second fiber end of a second optical fiber, light is emitted as a light beam into a detection area of the detector module at the respective local detector module, the first fiber end of the first optical fiber is also directed at the detection area, and forms an angle, e.g., 120°, that can be set, with the second fiber end, in order to capture the scattered light scattered at this angle at scattering and/or smoke particles present in the detection area. When using transmitted light detectors, the angle is 180°.

In an alternative or optional further development of the variant of the invention described above, the central analysis device has at least one light receiver, in particular a photodiode (PD), for converting the transmitted scattered light and/or transmitted light, in particular into a current and/or voltage signal, and in particular a light source, e.g. a light emitting diode (LED) or a laser diode, wherein the at least one first optical fiber, in particular all of the first optical fibers are connected in a light-guiding manner to the light receiver, and the at least one second optical fiber, in particular all of the second optical fibers, are connected to the light source, preferably in a light-guiding manner.

The combination of light source, in particular LED, with light receiver, in particular PD, for converting scattered light into a further processable signal is also referred to in technical jargon as a fiber optic detector module (LWL detector module). Since the captured scattered light is converted into a current and/or voltage signal, in particular via a photodiode, a software-supported evaluation is made possible in particular. By transmitting the scattered light and/or transmitted light from the local detector module in the form of a light signal, with a conversion only taking place in the central analysis device, the suction particle detection system has only passive components in the monitored area and is therefore also suitable for use in potentially explosive atmospheres. At the same time, the signal is transmitted from the local detector module to the central analysis device at the speed of light, with almost no time delay. In the case of several branches of a fluid line system, a light source and a light receiver or a separate LWL detector module can preferably be provided for each branch.

According to an advantageous embodiment of the invention, the central analysis device has at least one modulation means for modulating the light emitted by at least one light source and for assigning the scattered light and/or transmitted light captured by at least one light receiver to one or more local detector modules.

Preferably, the local detector modules are arranged along a pipe and/or hose line of the fluid line system, wherein each local detector module is at a distance that can be set individually, to the central analyzing means. A modulation of the light emitted by the light source therefore enables the identification of the respective local detector module detecting scattering and/or smoke particles, i.e. capturing scattered light, which in turn makes it possible to localize the monitored area at risk of fire. The basic principle used is known, for example, from laser-based distance meters. A corresponding localization effect can be achieved in another variant of the invention by using polarization filters.

In an exemplary configuration of the suction particle detection system according to the invention, particularly for rapid localization of a fire or a fire emergence, two or more local detector modules are arranged along the at least one pipe and/or hose line and the local detector modules are each assigned to a specified number of suction openings, in particular in a range between 1 and 5, preferably 3, with a desired dilution ratio of the test fluid flow being able to be set as required at the respective local detector module.

The at least two local detector modules of the light guiding system as well as the suction openings of the fluid line system are expediently arranged in series along or even within the pipe and/or hose line carrying the test fluid flow. By assigning the local detector modules to one or more of the suction openings, a desired dilution ratio of the test fluid flow can be set at the respective detector module. The dilution ratio depends on the number of, preferably geometrically identical, suction openings through which the test fluid flow passes along the pipe and/or hose line. This means that there is a dilution ratio of the test fluid flow of 1:1 downstream of the first suction opening in the direction of flow, whereas the dilution ratio downstream of the third suction opening in the direction of flow is already 1:3. Depending on the suction opening downwards of which a local detector module is arranged, its individual dilution ratio can consequently be set.

The dilution ratio correlates with the portion of light scattered, that is to say the scattered light and/or the transmitted light. When an amount of test fluid containing scattering and/or smoke particles is removed, its dilution is increased by each additional amount of test fluid taken along the pipe and/or hose line, with the volume-related portion of scattering and/or smoke particles contained in the test fluid flow and consequently the portion of scattered light scattered at it decreasing. On the basis of the scattered light and/or transmitted light respectively captured in each case at two or more local detector modules, each with a known dilution ratio, conclusions as to the local and temporal development and/or spread of fire and/or a fire emergence may be drawn.

The plurality of local detector modules are preferably evenly assigned to the suction openings arranged along the pipe and/or hose line, for example a local detector module could be provided every three or every four suction openings.

In order to simplify the evaluation of the signals captured by the individual local detector modules and to be able to evaluate them, in particular taking into account the respective dilution ratios, according to an exemplary variant of the invention, the dilution ratios, which are set as required and which are present at the respective local detector modules, are stored as a data set or data model, in particular on a storage unit, in the central analysis device.

Particularly advantageously, the dilution ratios that are individually present at the respective detector modules, are part of an expert software and a data model on the geometric and fluidic characteristics of the fluid line system.

For example, for redundant fire detection, an advantageous configuration of the invention provides that the central analysis device has at least one central scattered light detector module through which fluid flows, which is connected in a fluid-guiding manner to the fluid line system, in particular to the at least one pipe and/or hose line, and designed for the central capture of scattered light scattered at scattering and/or smoke particles that are contained in the test fluid flow.

For the detection of scattered light and converting the detected scattered light into an evaluable current and/or voltage signal, principally, the local detector modules together with the light receiver arranged in the central analysis device are completely sufficient for the detection of a fire. Additionally providing a central scattered light detector module through which fluid flows, called RAS detector module (RAS=Rauchansaugsystem) in the prior art, enables a redundant monitoring and verification of the scattering and/or smoke particles captured by the local detector modules. The central scattered light detector module is preferably arranged after the last suction opening or directly in front of the suction device in the direction of test fluid flow. Per fluid line system of a suction particle detection systems—even if it has a plurality of branches—typically one central scattered light detector module for the detection of scattering and/or smoke particles (also from the respective branches) is provided and as a component of the central analysis device integrated therein. Alternatively, however, it is also conceivable to assign to each branch of a fluid line system its own central scattered light detector module, which in this case are arranged in the hose and/or tube system and assigned to the respective branch.

Finally, the central analysis device according to an exemplary configuration of the invention has of a computing unit, in particular a processor, which computing unit is designed for evaluating the scattered light and/or transmitted light captured by the one or more local detector modules, and/or for evaluating the scattered light captured by the central scattered light detector module through which fluid flows, and/or for correlation with the dilution ratios stored as a data set.

For this purpose, the computing unit is preferably connected in a signal-transmitting manner to the at least one light receiver and/or to the central scattered light detector module through which fluid flows. The computing unit is preferably also connected in a signal-transmitting manner to a storage unit on which, in particular, a data model as part of an expert system on the geometric and fluidic characteristics of the fluid line system and/or on the dilution ratios of the test fluid flow in the respective local detector modules is stored. Of course, various program sequences or methods for particle detection, in particular for detecting and/or localizing a fire/or a fire emergence, can also be stored in the storage unit.

In this respect, the object of the invention posed at the outset is also achieved by a method for detecting and/or localizing a fire and/or a fire emergence in one or more monitored areas, which is preferably carried out by a suction particle detection system according to any one of the above-described embodiments. In the method according to the invention, in a first step, a respective amount of test fluid is removed from the one or more monitored areas via a fluid line system having at least one pipe and/or hose line and one or more suction openings each opening into a monitored area. In a second step, the amount of test fluid removed from the one or more monitored areas flows through one or more local detector modules as part of a test fluid flow, each of said modules being assigned to one or more suction openings.

The test fluid flow is preferably generated by operating one of the suction devices arranged at the end of the pipe and/or hose line. Since the suction openings open into the monitored areas, the atmosphere contained therein, in particular air, is removed in the form of a respective amount of test fluid and transported as part of the test fluid flow in the direction of the suction device. Here, the amount of test fluid removed by a particular suction opening passes through all further local detector modules arranged downstream to this suction opening and along the pipe and/or hose line up to the suction device.

In a third step, scattered light that is scattered at scattering and/or smoke particles contained in the test fluid flow and/or in the respective monitored area, and/or transmitted light passing through the scattering and/or smoke particles is captured by the one or more localized flow-through detector modules, and, in a fourth step, the captured scattered light and/or transmitted light in each case is transmitted to a central analysis device via at least one optical fiber.

Together with the amounts of test fluid, scattering and/or smoke particles contained in the monitored area can also be removed via a suction opening, which particles then pass through the local detector modules arranged downstream of this suction opening. In the event that a local detector module is designed as a scattered light detector, scattered light scattered at the scattering and/or smoke particles is captured and transmitted as a scattered light signal for evaluation by the central analysis device. In the event a local detector module is designed as a transmitted light detector, the transmitted light passing through the scattering and/or smoke particles is captured and transmitted as transmitted light signal for evaluation by the central analysis device.

In a fifth step, the transmitted scattered light and/or transmitted light is evaluated by means of the central analysis device for detecting a fire and/or a fire emergence and/or assigned to the one or more respective local detector modules for localizing a fire and/or a fire emergence.

Preferably, the central analysis device has a light receiver which converts the transmitted scattered light signals into corresponding current and/or voltage signals, a computing unit matches the converted signals with stored data models, whereby a fire and/or a fire hazard can be detected. An assignment can take place, for example, when using a spliced light guide, generating pulses and/or modulating the light emitted by a light source. To generate pulses, the light source can be switched on and off, for example, and the pulses generated in this way are evaluated in a time-resolved manner (LiDAR/ToF method). It is also conceivable to modulate the light emitted by the respective light source and to capture the phase shift of this modulation for localization (LiDAR/phase shift). Further localization options are the use of polarizing means, such as polarizing filters or an assignment on the basis of the first optical fiber transmitting the light signal. The method steps described are continuously repeated for fire monitoring and run essentially at the same time. Upon detection of a fire and/or a fire emergence, a corresponding message, e.g. in the form of a warning or alarm, can be output in particular by means of the computing unit.

According to an advantageous variant of the method a fire and/or a fire emergence is detected in the event that the scattered light captured by at least one local detector module and transmitted to the central analysis device exceeds an alarm threshold stored there.

Alternatively, when using local detector modules designed as transmitted light detectors, a fire and/or a fire emergence is detected in the event that the transmitted light captured by at least one local detector module and transmitted to the central analysis device falls below an alarm threshold stored there in particular for the respective local detector module.

Due to the almost instantaneous transmission of the scattered light and/or transmitted light signals, a "quick fire alarm" can be made much earlier by means of the light guiding system than when monitoring with a suction particle detection system alone, in which the transport time of an amount of test fluid to the central analysis device is, for example, 60 seconds.

A variant of the method of the invention advantageously provides that the captured and transmitted scattered light and/or transmitted light is assigned to the respective local detector module(s) by correlating a data set stored in the central analysis device, in particular on a storage unit, with dilution ratios set for the respective local detector modules with the transmitted scattered light and/or transmitted light, preferably with the scattered light intensity and/or transmitted light intensity, in particular in the computing unit or the processor.

The suction openings assigned to the individual monitored areas are expediently connected in series along the pipe and/or hose line, as a result of which the dilution of the test fluid flow increases in the direction of the suction device. This means that there are fewer smoke particles per volume of test fluid, which is why the proportion of scattered light scattered thereat also decreases or, in the case of transmitted light detectors, the proportion of transmitted light passing through the smoke particles increases. By storing the geometric and fluidic data, along with the assigned dilution ratios of the local detector modules as a data set or data model in the computing unit, this relationship can be used for assigning and localizing a fire and/or a fire emergence.

To reduce the likelihood of a false alarm, e.g. due to false variables or the like, as part of a "plausibility check" according to an exemplary variant of the method, the amounts of test fluid removed from the one or more monitored areas in each case flow, as test fluid flow, through a central scattered light detector module, and the scattered light captured by the central light scattering detector module is compared to the scattered light and/or transmitted light captured by the one or more local detector modules.

To this end, it is particularly advantageous to store the signals detected and transmitted by the individual local detector modules, preferably the signal strength, over a specified period of time as a time profile on the computing unit, in particular on the storage unit thereof. Such a time profile of the signal strength can be created, for example, during the transport time that the test fluid flow needs to get from a suction opening to the central analysis device. As soon as the central scattered light detector module arranged in the central analysis device detects a fire and/or a fire hazard based on smoke particles contained in the test fluid flow, the data transmitted from the central scattered light detection module can be compared to the stored data set of the local detector modules, and evaluated.

Additionally or optionally, as part of the plausibility check, the signals and/or data transmitted by the central scattered light detector module, the signals and/or data transmitted by the local detector modules and the time course thereof, and the data sets and/or data models on the geometric and/or fluidic characteristics of the fluid line system, in particular the dilution ratios, stored in the storage unit, can be compared and correlated, e.g. based on detection patterns, in order to increase the evaluation options and thereby in particular the reliability and the detection accuracy of the suction particle system according to the invention substantially.

In an exemplary variant of the method according to the invention, test particles, in particular as a test aerosol, can be released in one or more of the monitored areas for maintenance or for checking the functionality of a suction particle detection system, with the local detector modules, in the third step, capturing the scattered light scattered at the test particles and/or the transmitted light passing through the test particles.

Preferably, any contamination and/or clogging of suction openings can be localized by the release of the test particles, which are contained in particular in a test aerosol. For this purpose, the dilution ratios of the local detector modules, which are stored as a data model or data set and which are assigned to the respective monitored areas, can in turn be included in the evaluation of the captured scattered light and/or transmitted light. A contamination and/or clogging of a suction opening causes a reduction in the amount of test fluid removed from the assigned monitored area, which in turn reduces the dilution ratio of the test fluid flow present at the local detector module and consequently increases the proportion of scattered light captured or reduces the proportion of transmitted light captured as compared with the stored data set or data model. The clogged and/or contaminated suction opening can be localized by comparison with the stored data set or data model.

Further details, features, feature (sub)-combinations, advantages and effects based on the invention will be apparent from the following description of preferred exemplary embodiments of the invention and the drawings.

BRIEF DESCRIPTION OF THE SEVERAL VIEWS OF THE DRAWINGS

The figures are merely exemplary in nature and are only provided to promote understanding of the invention. Same elements are provided with the same reference numerals and are usually described only once.

DETAILED DESCRIPTION OF THE INVENTION

Figure 1:
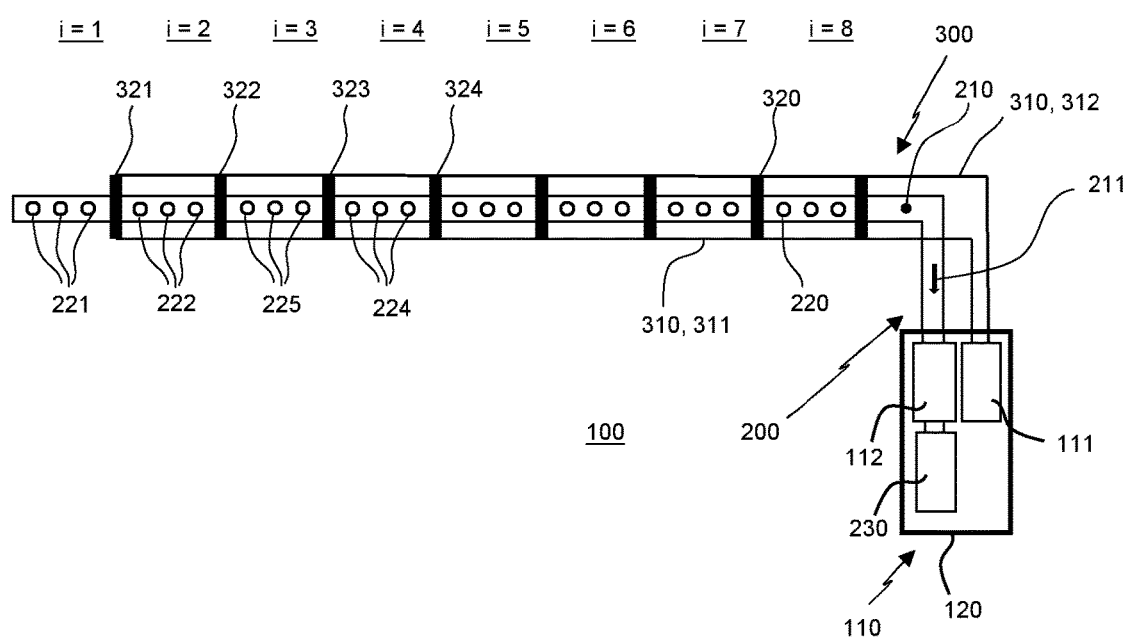
FIG. 1 shows a schematic representation of an exemplary embodiment of a suction particle detection system according to the invention having a central analysis device.

FIG. 1 shows a schematic representation of an exemplary embodiment of a suction particle detection system 100 according to the invention. In the embodiment depicted, the suction particle detection system 100 has, as essential components, a central analysis device 110, a fluid line system 200 and a light guiding system 300. Fluid line system 200 comprises a pipe and/or hose line 210 (a branch), the first end of which is connected in a fluid-guiding manner with a suction device 230, e.g. a fan. Suction device 230 is arranged in a housing 120 of central analysis device 110. A plurality of suction openings 220 are formed along pipe and/or hose line 210, each of which opens into assigned, here a total of eight monitored areas i=1-8. In the embodiment depicted by way of example, three suction openings 220 are assigned to each monitored area 1-8. In total, pipe and/or hose line 210 thus has 24 suction openings 220. The number of suction openings 220 per monitored area 1-8 can of course also differ and is based, for example, on the size of the assigned monitored area 1-8. During operation, suction device 230 generates a test fluid flow 211 directed along pipe and/or hose line 210 in the direction of suction device 230, an amount of test fluid being continuously removed from assigned monitored areas 1-8 by means of suction openings 220. In this embodiment, central analysis device 110 comprises a principally optional, central scattered light detector module 112, which is arranged upstream of suction device 230. By means of central scattered light detector module 112, scattering and/or smoke particles contained in test fluid flow 211 can be captured, which particles were removed from one or more of monitored areas 1-8 as part of a respective amount of test fluid. A typical value for the transport time of an amount of test fluid along entire pipe and/or hose line 210 to central scattered light detector module 112 is, for example, 60 seconds in this embodiment. The central scattered light detector module 112 is preferably designed as an RAS detector module. RAS detector modules are known from the prior art and are commonly used in suction particle detection systems 100.

The exemplary suction particle detection system 100 shown in FIG. 1 also has a light guiding system 300 with a light guide 310, which connects a number of local detector modules 320 with a light receiver 111, in particular in an LWL detector module, of central analysis device 110 in a light-guiding manner. LWL detector modules are known from the prior art and are used in particular for locally limited fire monitoring of devices. In this case, light guide 310 comprises at least one first optical fiber 311, which is provided for transmitting light or scattered light and/or transmitted light captured at one or more of local detector modules 320 to the light receiver 111. The transmission of the light or scattered light and/or transmitted light captured at the local detector modules 320 to light receiver 111 takes place almost instantaneously at the speed of light. At least one second optical fiber 312 is provided for the transmission of light originating from a light source 113, in particular from an LWL detector module, to respective local detector modules 320. In this embodiment, local detector modules 320 are each assigned to three suction openings 220 of a respective monitored area 1-8 and are arranged within pipe and/or hose line 210 downstream of corresponding monitored area 1-8 in the direction of flow of test fluid flow 211.

Figure 2:
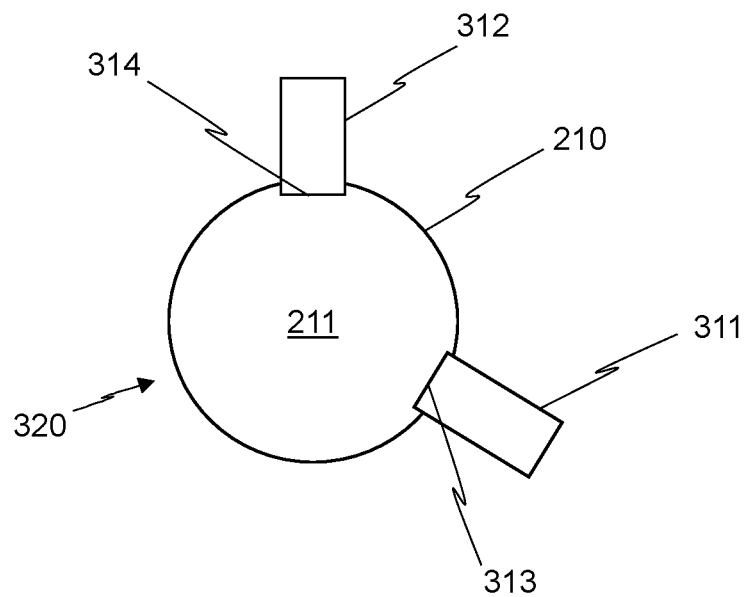
FIG. 2 shows a schematic representation of a first exemplary embodiment of a local detector module.

FIG. 2 shows a schematic representation of a first exemplary embodiment of a local detector module 320. The local detector module is formed, for example, according to FIG. 1, within pipe and/or hose line 210 of fluid line system 200. A second fiber end 314 of second optical fiber 312 is mounted to pipe and/or hose line 210 in such a way that light transmitted via second fiber end 314 of second optical fiber 312 is emitted into the flow cross section of pipe and/or hose line 210 and forms there a detection area intersecting test fluid flow 211. A first fiber end 313 of first optical fiber 311 is also mounted to pipe and/or hose line 210 and directed to the detection area. First fiber end 313 and second fiber end 314 are aligned with one another at a desired angle, in this case approximately 120°, so that first fiber end 313 captures scattered light scattered at this angle.

Figure 3:
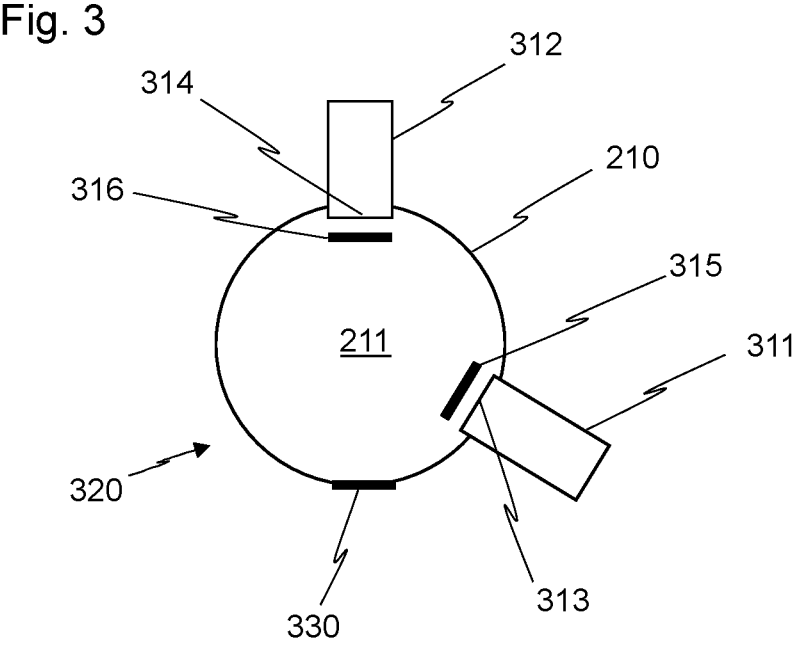
FIG. 3 shows a schematic illustration of the first exemplary embodiment of the local detector module of FIG. 2 with polarizing filters.

The exemplary embodiment of FIG. 2 is also shown schematically in FIG. 3. In addition, a second polarizing filter 316 is arranged before second fiber end 314 for polarizing the emitted light or a first polarizing filter 315 is arranged before first fiber end 313 for polarizing the scattered light to be captured. Opposite second polarizing filter 316 an absorber 330 is provided on the inner wall of pipe and/or hose 210 which absorber absorbs not scattered, in particular polarized light. The polarization of light or scattered light in individual local detector modules 320 simplifies a local assignment of the detected scattering and/or smoke particles, and thus a potential fire and/or fire emergence by evaluating the transmitted light signals.

Figure 4:
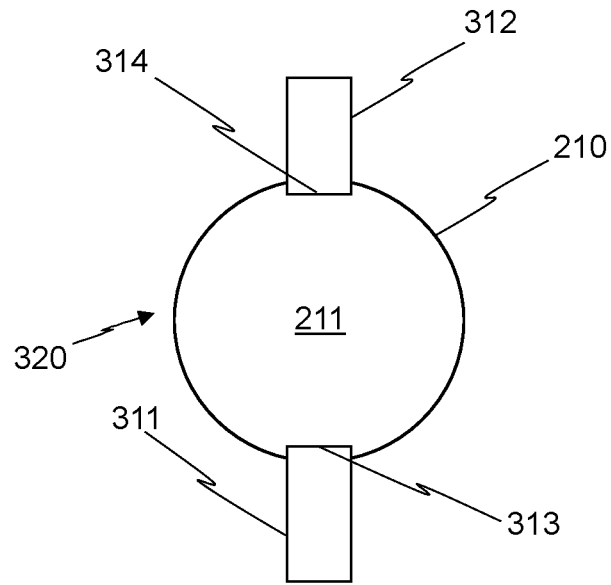
FIG. 4 shows a schematic representation of a second exemplary embodiment of a local detector module.
Figure 5:
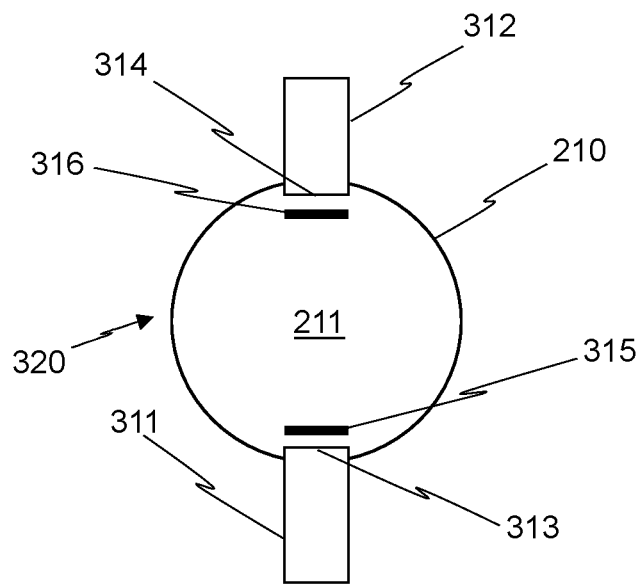
FIG. 5 shows a schematic representation of the second exemplary embodiment of the local detector module from FIG. 4 with polarizing filters.

FIGS. 4 and 5 schematically show a second exemplary embodiment of a local detector module 320, which is designed as a transmitted light detector. Principally, all exemplary embodiments of the invention can also be implemented with such a transmitted light detector which is utilized instead of the local detector modules 320 generally described and designed as a scattered light detector. In the transmitted light detector variant, first fiber end 313 and second fiber end 314 are opposite one another or aligned at an angle of 180° with one another, so that first fiber end 313 detects the transmitted light that is not scattered at scattering and/or smoke particles. In FIG. 5, the second exemplary embodiment (corresponding to the FIG. 5) is formed with a first polarizing filter 315 and a second polarizing filter 316.

Figure 6:
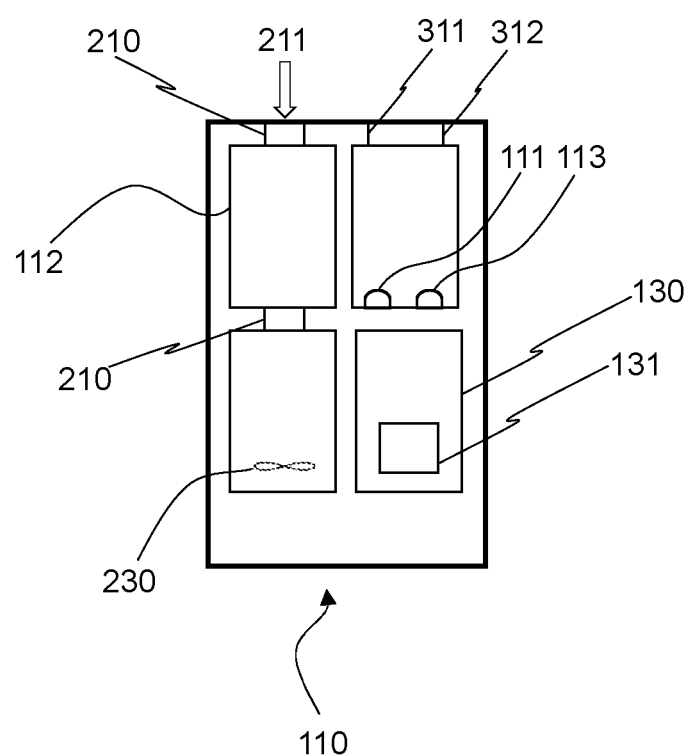
FIG. 6 shows a schematic representation of a central analysis device for a suction particle detection system according to the invention.

A schematic representation of a central analysis device 110 for an embodiment of a suction particle detection system 100 according to the invention, for example according to FIG. 1, is shown in FIG. 6. Central analysis device 110 according to this embodiment comprises a suction device 230, in particular a fan, which is connected in a fluid-guiding manner to a pipe and/or hose line 210 of the fluid line system 200 of the suction particle detection system 100 and provided for generating test fluid flow 211. The central scattered light detector module 112 is arranged in the direction of flow of test fluid flow 211 upstream to suction device 230 and also connected to pipe and/or tube line 210 in a fluid-guiding manner, which module captures scattering and/or smoke particles contained in the test fluid flow and converts the captured light signals into current and/or voltage signals for further evaluation. For conversion of light signals transmitted via at least one first optical fiber 311 of light guide 310, into current and/or voltage signals, a light receiver 111, preferably designed as a photodiode, is designed as a component of central analysis device 110. According to the embodiment depicted, light receiver 111 is part of an LWL detector module, which module also has a light emitter or a light source 113, preferably a light emitting diode. The light emitted by light source 113 is guided as a light signal to respective local detector modules 320 via at least one second optical fiber 312. Since the conversion of the respective light signals only takes place within central analysis device 110, all active or current-carrying components of suction particle detection system 100 are arranged centrally and outside the respective monitored rooms 1-8. The components of suction particle detection system 100 arranged in monitoring spaces 1-8 are exclusively passive components, which also enables use in a potentially explosive atmosphere.

The central analysis device 110 also comprises a programmable computing unit 130 having a storage unit 131, which, for recording and evaluating the signals transmitted by light receiver 111, in particular by the LWL detector module, and by the central scattered light detector module 112, in particular the RAS detector module, is connected in a signal-guiding manner with these devices. For this purpose, computing unit 130 is equipped with expert software, in particular stored in storage unit 131. In addition, various program sequences for carrying out a method for detecting and/or localizing a fire and/or a fire emergence in one or more of the monitored areas 1-8 are implemented on storage unit 131. The detection and/or localization of a fire and/or a fire emergence is by means of the expert software based on stored data models, which, inter alia, contain dilution ratios $V_i$ individually present at respective local detector modules 320, as well as the geometric and fluidic characteristics of suction particle detection systems 100, in particular the fluid line system 200.

FIGS. 7-10 show data models for detecting and localizing a fire and/or a fire emergence which data models are stored in computing unit 130, in particular storage unit 131. The stored data models can be determined empirically and are based on the geometric data of fluid line system 200, in particular the distances between suction openings 220, the fluidic characteristics, for example flow velocity and/or volume flow of the test fluid flow, and individual dilution ratios $V_i$ individually present at respective local detector models 320. The diagram profiles shown each relate, by way of example, to the evaluation of the test fluid captured by first local detector module 321, which module is assigned to first monitored area 1.

Figure 7:
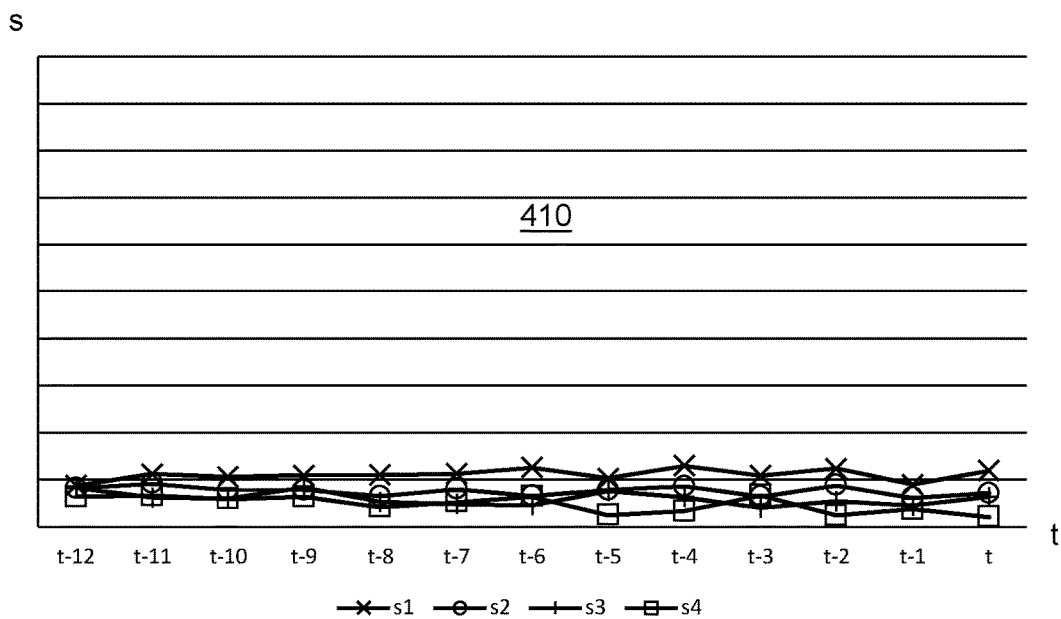
FIG. 7 shows a schematic diagram of an exemplary signal strength profile for a "fresh air signal"

In FIG. 7, a typical profile of a "fresh air signal" 410 is plotted over a period of time with in this case, for example, 13 times of measurement t-12 to t. The diagram shows in each case a time course of the signal strength $s_i$ from the first four monitored areas i=1-4 with respect to the direction of flow of test fluid flow 211 (see FIG. 1). A local detector module 321, 322, 323, 324 is assigned to each monitored area 1-4, plotted signal strengths $s_1$-$s_4$ correspond to the scattered light signal captured at local detector module 321-324 in each case, or to the current and/or voltage signal resulting therefrom through conversion by means of light receiver 111, and are plotted purely schematically in FIG. 7. A fresh air signal 410 for monitored area 1, for example, exists if no smoke particles are captured in this area and the measured signal strength $s_1$ is constant over the specified measurement period t-12 to t. The measurement period t-12 to t can be based, inter alia, on the transport time of an amount of test fluid through fluid line system 200. Due to the lighting conditions and/or scattering at other scattering particles such as, for example, dust, the signal strength $s_1$ always has a basic value greater than 0. Local detector module 321 assigned to first monitored area 1 is, again according to FIG. 1, positioned downstream of three suction openings 221 arranged in monitored area 1 and thus has a dilution ratio $V_1$ of 1:3. In the practical implementation, a monitored area i typically corresponds to a room or also a section of a room of a building. In case of fire or fire hazard in a room or section of a room corresponding to first monitored area 1, for example, the locally generated smoke particles are only captured by closest suction opening 221, whereas the other two suction openings 221 continue to suck in fresh air. This leads to a dilution of the amount of test fluid containing the sucked-in smoke particles along pipe and/or hose line 210, as a result of which the dilution ratio $V_1$ of 1:3 is already present at detector module 321. Between local detector modules 321-324 there are three further suction openings 222, 223, 224 assigned to the respective monitored areas 2-4, which is why the dilution ratio $V_2$ is 1:6 at local detector module 322 assigned to second monitored area 2, the dilution ratio $V_3$ is 1:9 at local detector module 323 assigned to third monitored area 3, and the dilution ratio $V_4$ is 1:12 at local detector module 324 assigned to fourth monitored area 4. Accordingly, individual local detector modules 321-324 show a signal strength $s_1$-$s_4$ that decreases along pipe and/or hose line 210. When using local detector modules 320 designed as transmitted light detectors, the basic value of the signal strength $s_i$ is correspondingly higher due to the continuous capture of the transmitted light (see FIGS. 4 and 5).

Figure 8:
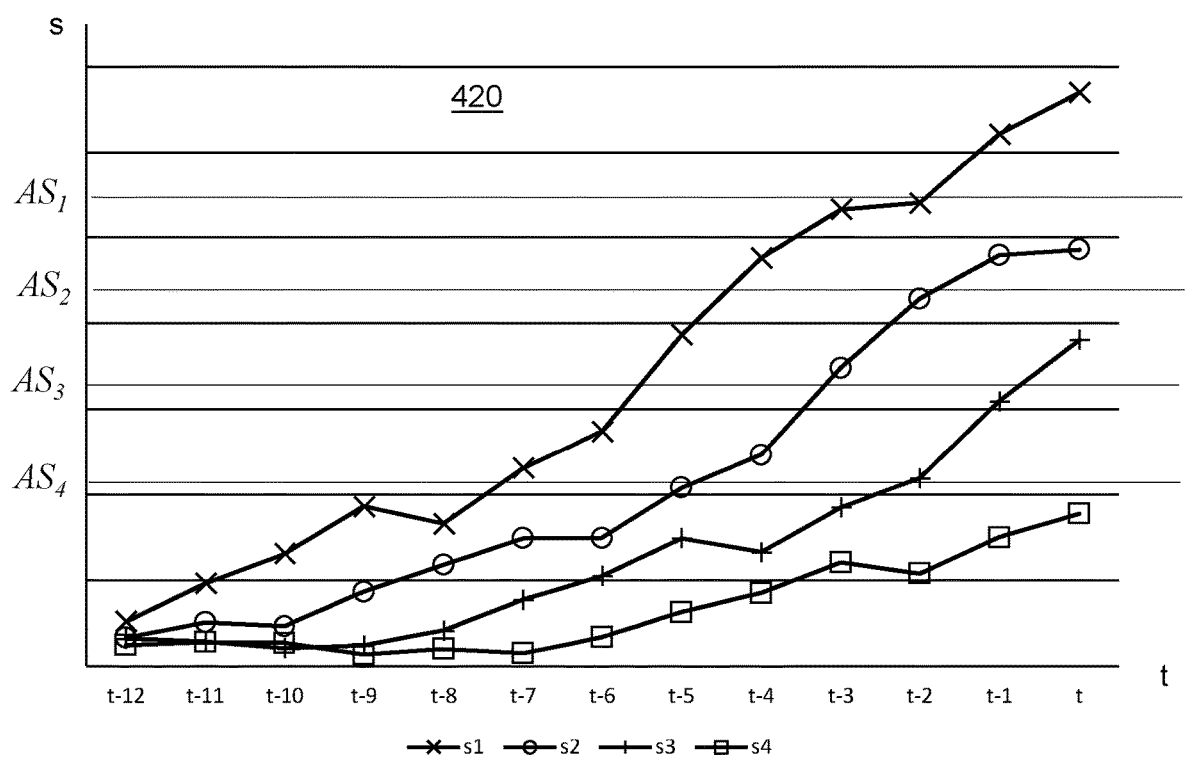
FIG. 8 shows a schematic diagram of an exemplary signal strength profile for a "fire pattern"

A respective time course of signal strengths $s_1$-$s_4$ of a "fire pattern" 420 can be seen in FIG. 8. An increased signal strength $s_1$ is already evident at first local detector module 321 at point in time t-11, which signal strength increases further over remaining times of measurement t-10 to t. Because of the transport time along pipe and/or hose line 210, the increase in signal strengths $s_2$-$s_4$ at local detector modules 321-324 is shown offset in time. At point in time t-1 measured signal strength $s_1$ exceeds an alarm threshold $AS_1$ stored in the data model and specific for the first local detector module. The alarm thresholds $A_2$-$A_4$ of the other local detector modules 322-324 are lower in accordance with the higher dilution ratios $V_2$-$V_4$. Conversely, when using local detector modules 320 designed as transmitted light detectors, a lower alarm threshold $AS_i$ would have to be set in each case, which is undershot in the event of a fire.

Figure 9:
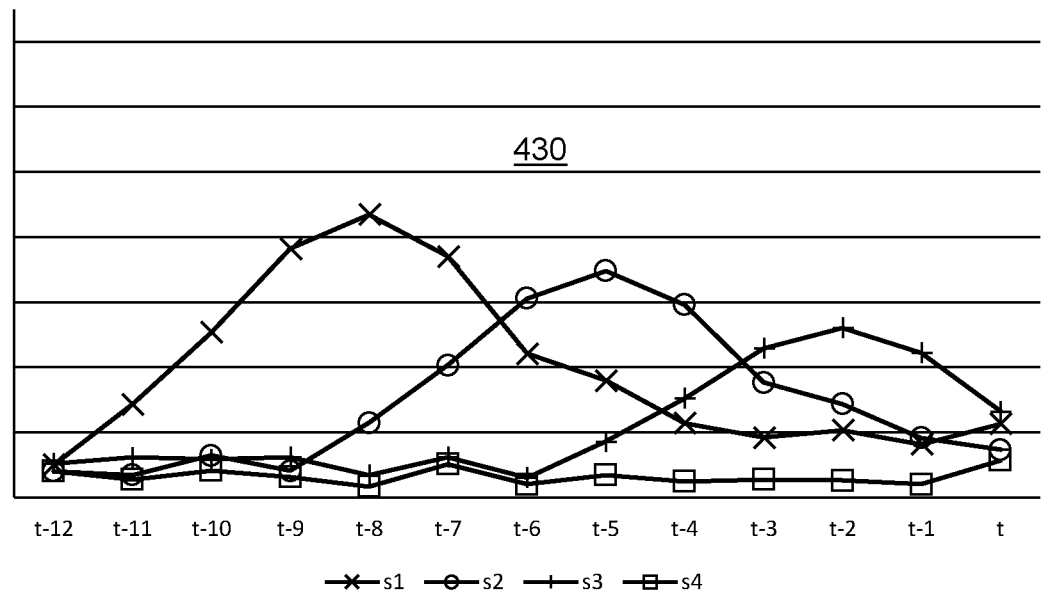
FIG. 9 shows a schematic diagram of an exemplary signal strength profile for a "false variable"
Figure 10:
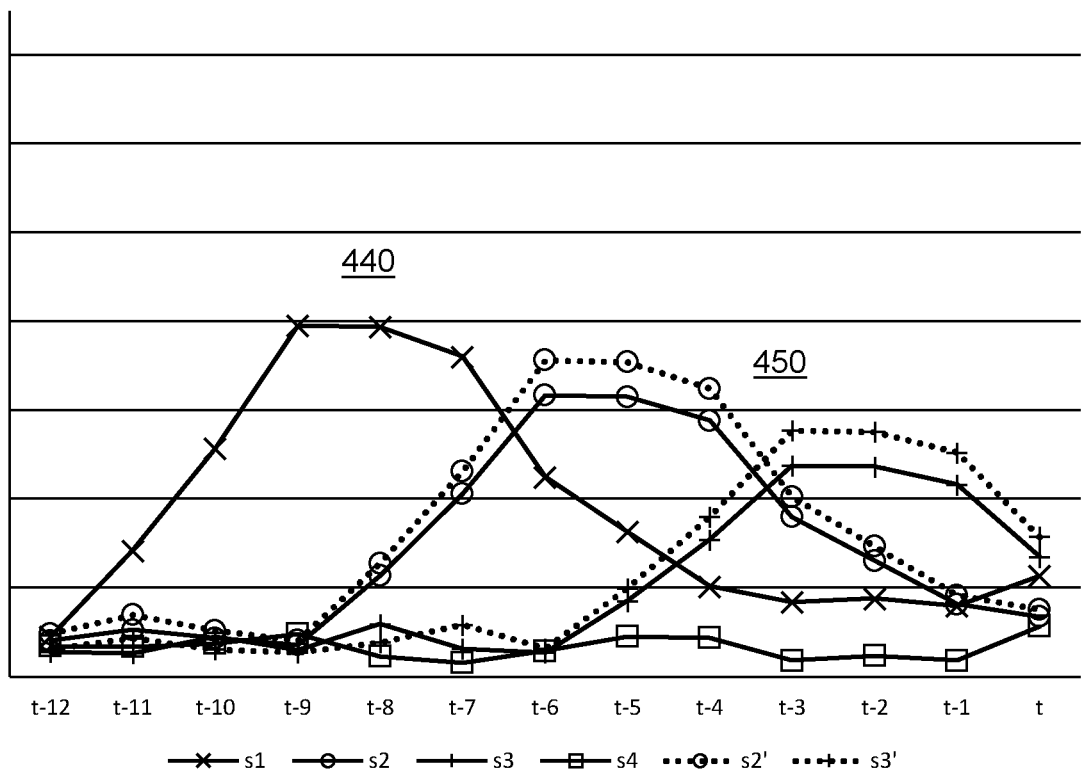
FIG. 10 shows a schematic diagram of an exemplary signal strength profile for a "contamination pattern"

In FIG. 9, a time course of signal strength $s_1$ typical for a "false variable" is depicted in which the signal strength increases for a short time, in the range of times of measurement t-12 to t-8, and then decreases back to the basic value in the range of times of measurement t-8 to t. An increase correspondingly offset in time, with subsequent drop in signal strengths $s_2$-$s_4$ can be captured with lower values due to dilution, and local detector modules 322-324. When using local detector modules 320 designed as transmitted light detectors, a reverse course, in which the signal strengths $s_i$ initially drop and then again increase, would be observed.

Suction particle detection system 100 must be checked for its full operability at regular time intervals. For this purpose, for example, a test aerosol can be introduced into pipe and/or hose line 210 via first monitored area 1. A typical "test pattern" 440 together with a typical "contamination pattern" 450 is depicted by way of example in the diagram of FIG. 10 and, in principal, corresponds to the signal strength profile of false variable 430. By way of example, respective profiles of the signal strengths $s_{2'}$ and $s_{3'}$, which show the respective contamination pattern 450, for second monitored area 2 and third monitored area 3, are drawn in dashed lines. The profiles indicate contamination and/or clogging of one or more of corresponding suction openings 222, 223. In the event of contamination and/or clogging, a smaller amount of test fluid is sucked in through the respective suction opening 222, 223, the dilution ratio $V_2$, $V_3$ decreases and the captured signal strengths $s_{2'}$, $s_{3'}$, are above the expected signal strengths $s_2$, $s_3$. When using local detector modules 320 designed as transmitted light detectors, the respective signal strength profile is correspondingly reversed.

Figure 11:
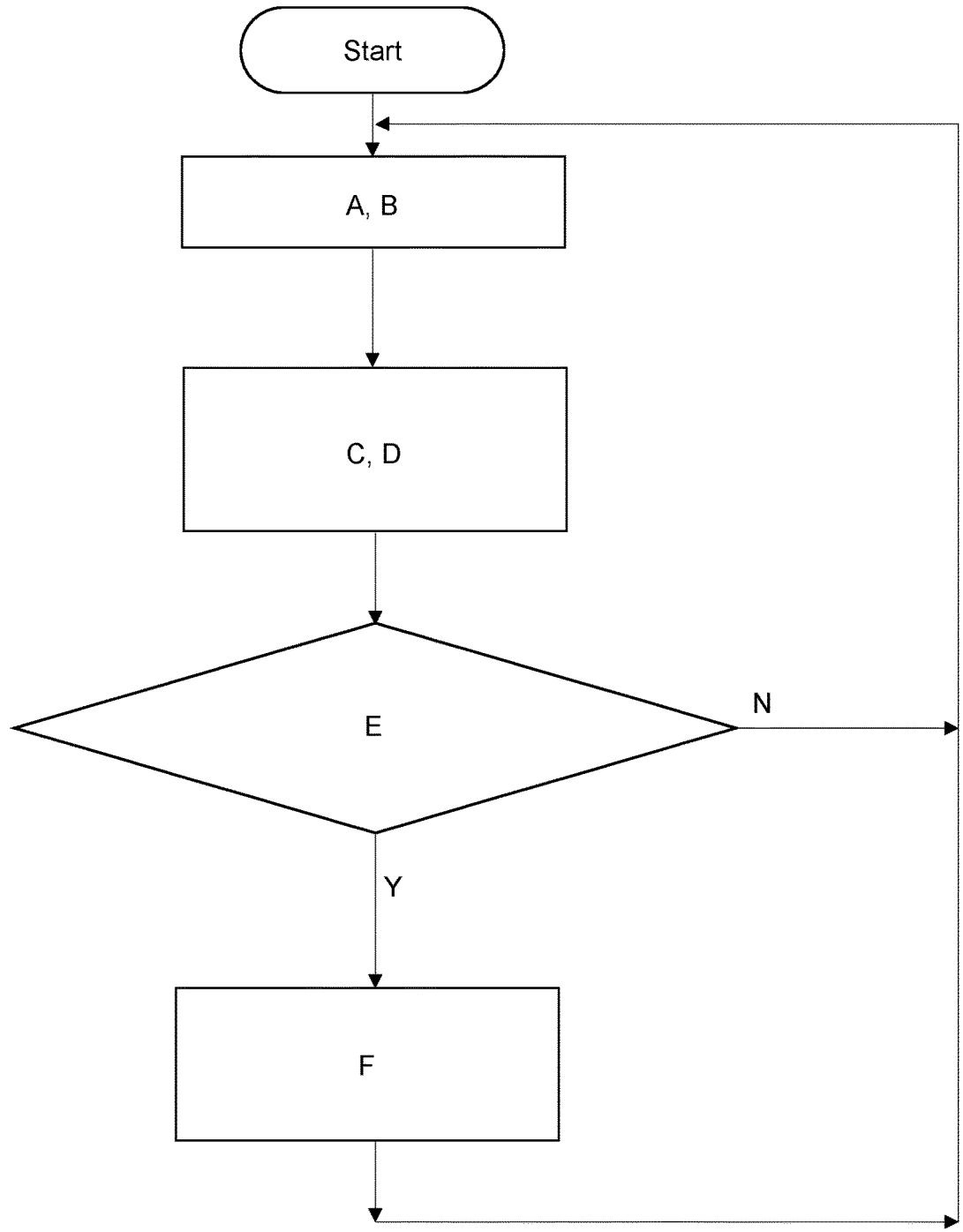
FIG. 11 shows a flow chart of a first exemplary variant of the method according to the invention for detecting and/or localizing a fire and/or a fire emergence in one or more monitored areas.

FIG. 11 shows a flow chart of a first exemplary variant of a method according to the invention for detecting and/or localizing a fire and/or a fire emergence in one or more monitored areas i, which variant is preferably carried out with a suction particle detection system 100 according to the invention, in particular in accordance with FIG. 1. The method enables rapid fire detection and is started, or suction particle detection system 100 is put into operation, by turning on suction device 230 in particular by means of computing unit 130. As a result, in a first step A, a test fluid flow 211 is generated along pipe and/or hose line 210. The atmosphere, in particular air, contained in monitored areas i is removed from the monitored areas i in the form of a respective amount of test fluid via suction openings 220 opening into monitored areas i, and transported towards suction device 230. As part of test fluid flow 211, in a second step B, the amounts of test fluid removed, pass through all further detector modules 320 that are arranged downstream.

In a third step C, either scattered light that is scattered at scattering and/or smoke particles contained in test fluid flow 211 and/or in respective monitored area i or, alternatively, when using transmitted light detectors as local detector modules 320, transmitted light passing through the scattering and/or or smoke particles, is captured by local flow-through detector modules 320, and, in a fourth step D, the captured scattered light and/or transmitted light in each case is transmitted through at least one light guide 310, in accordance with FIG. 1 through the at least one first optical fiber 311, to a central analysis device 110. The respective signal strength $s_i$ of the scattered light and/or transmitted light signals originating from the local detector modules 320 assigned to the respective monitored areas i is measured in central analysis device 110. It is advantageous for this purpose to convert the transmitted scattered light and/or transmitted light into a current and/or voltage signal by means of a light receiver 111, in particular by means of an LWL detector module, which signal can then be digitally processed by computing unit 130 of central analysis device 110.

In order to detect a fire and/or a fire emergence, the respective signal strengths $s_i$ are evaluated by computing unit 130 in a fifth step E. To this end, computing unit 130 checks each signal strength $s_i$ captured by a local detector module 320 to determine whether an alarm threshold $AS_i$ stored for this local detector module 320 individually is exceeded (see FIG. 8 "fire pattern"). In the event that captured signal strength $s_i$ of at least one of local detector modules 320 exceeds the value of the associated alarm threshold $AS_i$ (=Y), a fire and/or a fire emergence is detected, and can advantageously be signaled in a sixth step F. In the event that captured signal strength $s_i$ of none of local detector modules 320 exceeds the value of associated alarm threshold $AS_i$ (=N; see FIG. 7 "fresh air signal"), but also, optionally, after a fire and/or a fire emergence alarm, the method is continued, steps A to E being carried out continuously. When using local detector modules 320 designed as transmitted light detectors, the detection is correspondingly reversed in the event that the captured signal strength $s_i$ of at least one of local detector modules 320 falls below the value of associated alarm threshold $AS_i$.

In addition to detecting, in fifth step E, localizing the fire and/or the fire emergence may be performed by assigning the captured scattered light signal (or transmitted light signal), whose signal strength $s_i$ exceeds (or falls below) associated alarm threshold $AS_i$, to associated local detector module 320 and consequently to the monitored area i in which the scattering and/or smoke particles are present. For this purpose, suction openings 220 assigned to individual monitored areas i are expediently connected in series along pipe and/or hose line 210, as a result of which the dilution of test fluid flow 211 increases in the direction of suction device 230. Dilution ratios $V_i$ resulting therefrom for respective monitored areas i or at assigned, local detector module 320 are stored as a data set or data model on storage unit 131 of computing unit 130, and can be correlated or matched with the captured signal strengths $s_i$ for localizing the fire and/or the fire emergence. Then, in sixth step F, upon detection of a fire and/or a fire hazard, expediently the location of the fire and/or the fire hazard is signaled based on the assigned local detector module 320 or monitored area i before the method continuously continues at step A.

Figure 12:
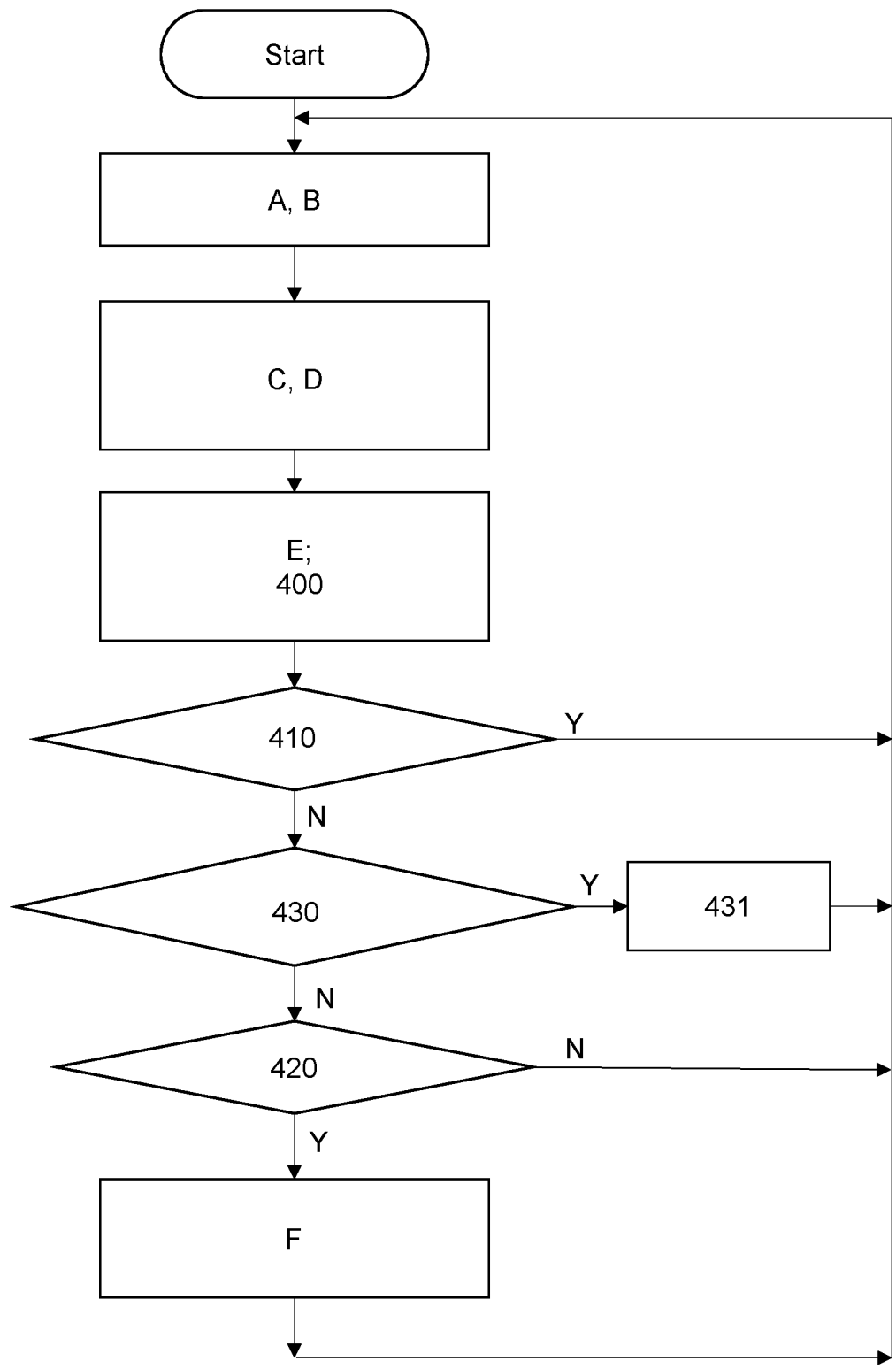
FIG. 12 shows a flow chart of a second exemplary variant of the method according to the invention.

A flow chart of a second exemplary variant of a method according to the invention for detecting and/or localizing a fire and/or a fire emergence, wherein, in the step E, additionally a plausibility check 400 is carried out, is apparent from FIG. 12. Steps A, B and C are carried out according to the first exemplary variant. In fourth step D, the respective signal strength $s_i$ of the scattered light and/or transmitted light signals originating from the associated monitored areas i is measured and additionally stored in storage unit 131 of computing unit 130. To this end, a time course of signal strengths $s_i$ is created over a previously set period of time by storing t-12 to t measured values of the captured signal strengths $s_i$ at periodically recurring points in time. As part of plausibility check 400, the measurement data profiles determined in this way are compared with data sets or data models stored in storage unit 131, for example in the form of detection patterns, which map time courses of signal strengths $s_i$ over points in time t-12 to t that are typical for the respective case. In the following, three possible steps of a plausibility check 400 are explained in more detail by way of example.

If a comparison of the course of the captured signal strengths $s_i$ with a stored fresh air signal 410, carried out by computing unit 130, provides a sufficient match (=Y), the plausibility check 400 can be concluded and the method can be continued continuously with first step A. If the comparison carried out does not provide a sufficient match (=N), plausibility check 400 is continued.

To this end, computing unit 130 can check the presence of a (short-term) false variable 430 by comparing the course of the captured signal strengths $s_i$ with a correspondingly stored detection pattern for a false variable 430. If the test result is positive (=Y), a message 431 about the presence of a false variable 430 can be output, and the method is continuously continued with first step A. If the check for the presence of a false variable 430 turns out negative (=N), plausibility check 400 is continued.

A comparison of the course of the captured signal strengths $s_i$ with a correspondingly stored fire pattern 420 can also be part of the plausibility check. If the course of the captured signal strengths si deviates from fire pattern 420 to be expected (=N), the method is continued continuously at first step A. If, on the other hand, a (sufficient) match with fire pattern 420 to be expected is found, a fire and/or a fire emergence together with monitored area i from which the scattering and/or smoke particles originate are signaled in step F.

Both the steps of plausibility check 400 described and their sequence are each exemplary. All steps are optional and, as required, can be included in the method sequence or supplemented and/or replaced by additional steps. For example, as part of the plausibility check 400, the amounts of test fluid respectively removed from the one or more monitored areas i can be redundantly captured by the central scattered light detector module 112, and the data set determined by means of central scattered light detector module 112 can be compared with the data sets originating from local detector modules 320.

Figure 13:
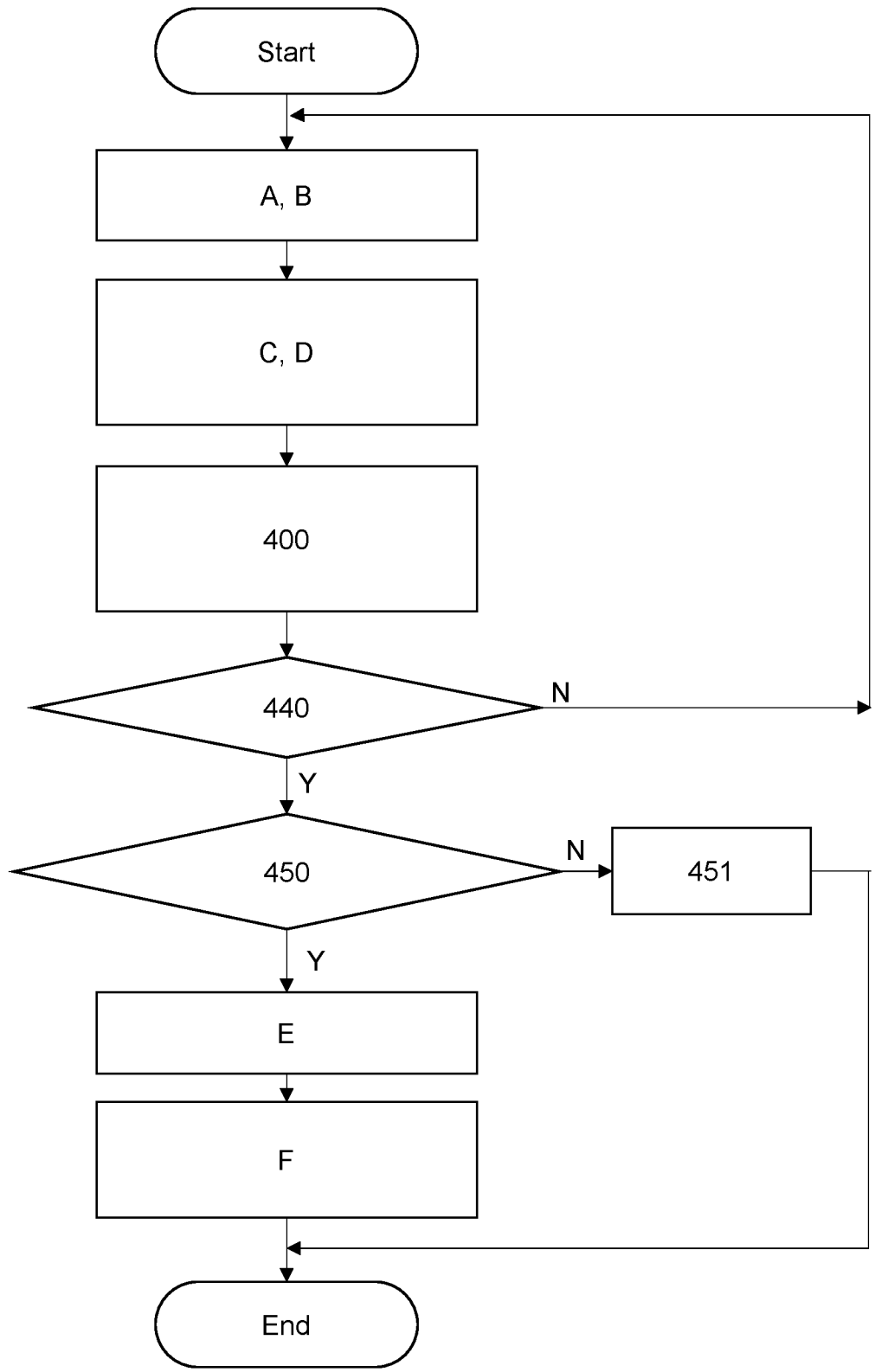
FIG. 13 shows a flow chart of a third exemplary variant of the method according to the invention.

A third exemplary method sequence is shown in the flow chart of FIG. 13, in which suction particle detection system 100 is supplied with a test aerosol containing test particles for maintenance and checking of full operability. To initiate the program sequence, suction particle detection system 100 is started up in a service mode and suction device 230 is switched on to generate test fluid flow 211. The test aerosol is introduced into one or more monitored areas i, removed as a component of the amounts of test fluid via suction openings 220, and passes local detector modules 320 in test fluid flow 211 (steps A, B). In doing so, local detector modules 320 capture scattered light scattered at the test particles or transmitted light passing through the test particles, which is transmitted to central analysis device 110 and measured there (steps C and D). Measured signal strength $s_i$ is recorded for a specified period of time, and the recorded profiles are subjected to a sequence of a plausibility check 400 provided for the test aerosol.

In this case, computing unit 130 compares the temporal profiles of the signal strengths $s_i$ transmitted by local detector modules 320 with a test pattern 440 that is typical of the test aerosol and is stored in storage unit 131. If a test pattern 440 and thus the introduction of the test aerosol in fluid line system 200 is detected (=Y), plausibility check 400 is continued, in case of a negative result (=N), the method is continued from first step A.

Following the detection of the test aerosol, computing unit 130 checks for contamination of one or more suction openings 220 by comparing the time courses of the signal strengths $s_i$ transmitted by local detector modules 320 with a contamination pattern 450. An exemplary contamination pattern 450, in which suction openings 222 and 223 assigned to second monitored area 2 and third monitored area 3 are clogged and/or contaminated, is plotted in FIG. 10 by way of example, and has already been explained above in the associated paragraph of the description. If no contamination and/or clogging is detected on the basis of the comparison carried out (=N), a corresponding message "clean" 451 is output and the method or the program sequence can be ended. If, on the other hand, contamination and/or clogging is detected (=Y), the associated monitored area i is localized in fifth step E in accordance with the second exemplary method sequence according to FIG. 12. In sixth method step F, the contamination and/or clogging is signaled together with the associated monitored area i before the method or the program sequence is ended.

Figure 14:
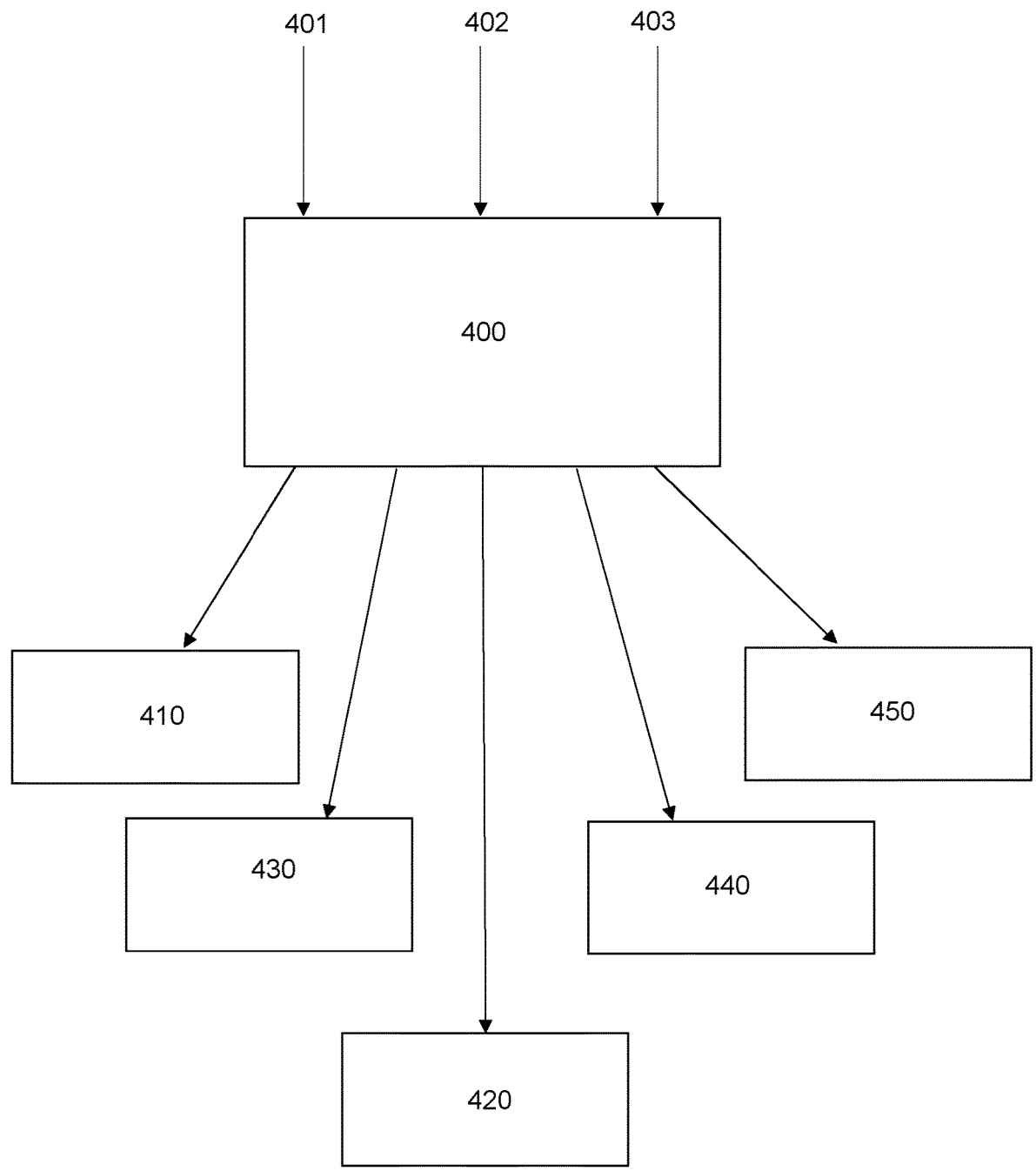
FIG. 14 shows a schematic representation for carrying out a plausibility check.

Finally, FIG. 14 shows a schematic overview of plausibility check 400, which involves, on the one hand, the data sets 401 measured with local detector modules 320, data set 402 measured with central scattered light detector module 112 and, on the other hand, data sets or data models 403 based on the geometric and fluidic characteristics of fluid line system 200, in particular dilution ratios Vi, which are stored in storage unit 131.

Based on a comparison of the measured values with the stored values, as part of plausibility check 400, a fresh air signal 410, a fire pattern 420, a false variable 430, a test pattern 440 and/or a contamination pattern 450, for example, can be detected and their cause can be localized. The pattern detection can be carried out with known image detection methods such as CNN (convolutional neural network).

LIST OF REFERENCE SYMBOLS 100 suction particle detection system
110 central analysis device
111 light receiver
112 central scattered light detector module, in particular RAS detector module
113 light source
120 housing
130 computing unit, in particular processor
131 storage unit
200 fluid line system
210 pipe and/or hose line
211 test fluid flow
220 suction opening
221 suction openings of the first monitored area
222 suction openings of the second monitored area
223 suction openings of the third monitored area
224 suction openings of the fourth monitored area
230 suction device
300 light guiding system
310 light guide
311 first optical fiber
312 second optical fiber
313 first fiber end
314 second fiber end
315 first polarizing filter
316 second polarizing filter
320 local detector module
321 local detector module of the first monitored area 322 local detector module of the second monitored area
323 local detector module of the third monitored area
324 local detector module of the fourth monitored area
330 absorber
400 plausibility check
401 measured data set, local detector module
402 measured data set, central scattered light detector module
403 stored data sets or data models
410 fresh air signal
420 fire pattern
430 false variable
431 message false variable
440 test pattern
450 contamination pattern
451 message "clean"
i=1 . . . x monitored area
$AS_i$ alarm threshold
$s_i$ signal strength
$s_{i'}$ captured signal strength
t point in time
$V_i$ dilution ratio
N no
Y yes
A first step
B second step
C third step
D fourth step
E fifth step
F sixth step

The invention claimed is:

1. A suction particle fire detection system, for detecting or locating a fire or a fire emergence, comprising
a fluid guiding system (200) having at least one pipe or hose line (210) which, via one or more suction openings (220) for the respective removal of an amount of test fluid, opens into one or more monitored areas (i), and having a suction device (230), which is connected in a fluid-guiding manner to the at least one pipe or hose line (210) in order to generate a test fluid flow (211) along the at least one pipe or hose line (210), and
a light guiding system (300) having one or more local detector modules (320) each assigned to at least one suction opening (220) and designed for local capture and transmission of scattered light scattered at particles or smoke particles present in the respective monitored area (i) or the test fluid flow (211), and configured for the capture and transmission of transmitted light passing through the particles or smoke particles, and having at least one light guide (310) connected in a light-guiding manner to the one or more local detector modules (320) and a central analysis device (110) for evaluation of the scattered light or transmitted light captured and transmitted by each of the one or more local detector modules (320).

2. The suction particle detection system (100) according to claim 1,
characterized in that
the one or more local detector modules (320) are each arranged within a flow cross section of the at least one pipe or hose line (210) and/or within the test fluid flow (211).

3. The suction particle detection system (100) according to claim 1,
characterized in that
the at least one light guide (310) of the light guiding system (300) is an optical waveguide or glass fiber cable having at least one first optical fiber (311) and at least one second optical fiber (312) for the transmission of light or scattered light between the one or more local detector modules (320) and the central analysis device (110).

4. The suction particle detection system (100) according to claim 3,
characterized in that
the one or more local detector modules (320) each have a first fiber end (313) of a first optical fiber (311) and a second fiber end (314) of a second optical fiber (312), wherein the first fiber end (313) of the first optical fiber (311) and the second fiber end (314) of the second optical fiber (312) are aligned with one another at an angle that can be selected as required.

5. The suction particle detection system (100) according to claim 3,
characterized in that
the central analysis device (110) has at least one light receiver (111) for converting the transmitted scattered light into a current or voltage signal, and a light source (113), wherein the at least one first optical fiber (311) is connected in a light-guiding manner to the light receiver (111), and the at least one second optical fiber (312) is connected to the light source (113) in a light-guiding manner.

6. The suction particle detection system (100) according to claim 5,
characterized in that
the central analysis device (110) comprises at least one light modulator configured for modulating light emitted from at least one light source (113) and for assigning the scattered light or transmitted light captured by at least one light receiver (111) to one or more local detector modules (320).

7. The suction particle detection system (100) according to claim 6,
characterized in that
two or more local detector modules (320) are arranged along the at least one pipe or hose line (210), and the local detector modules (320) are each assigned to a specified number of suction openings (220), wherein a desired dilution ratio ($V_i$) of the test fluid flow (211) can be set as required at the respective local detector module (320).

8. The suction particle detection system (100) according to claim 7,
characterized in that
dilution ratios ($V_i$), which are set as required and which are present at the respective local detector modules (320), are stored as a data set or data model (403) in the central analysis device (110).

9. The suction particle detection system (100) according to claim 8,
characterized in that
the central analysis device (110) has at least one central scattered light detector module (112) through which fluid flows, which is connected to the at least one pipe or hose line (210) in a fluid-guiding manner, and configured for the central capture of scattered light scattered at particles or smoke particles present in the test fluid flow (211).

10. The suction particle detection system (100) according to claim 9,
characterized in that
the central analysis device (110) has a computing unit (130) which is designed to evaluate the scattered light or transmitted light captured by the one or more local detector modules (320) or to evaluate the scattered light captured by the central scattered light detector module (112) through which fluid flows, or for correlation with the dilution ratios ($V_i$) stored as a data set or data model (403).

11. A method for detecting or localizing a fire or a fire emergence in one or more monitored areas (i) using a suction particle detection system (100), the method comprising

- in a first step (A), removing a respective amount of test fluid from the one or more monitored areas (i) via a fluid line system (200) having at least one pipe or hose line (210) and one or more suction openings (220) each opening into a monitored area (i),
- in a second step (B), flowing the amount of test fluid removed from the one or more monitored areas (i) as part of a test fluid flow (211) through one or more local detector modules (320), each assigned to one or more suction openings (220),
- in a third step (C), scattered light that is scattered at particles or smoke particles contained in the test fluid flow (211) or in the respective monitored area (i), or transmitted light passing through the particles or smoke particles is captured by the one or more local flow-through detector modules (320),
- in a fourth step (D), transmitting the respectively captured scattered light or transmitted light to a central analysis device (110) via at least one light guide (310), and
- in a fifth step (E), evaluating the transmitted scattered light or transmitted light by means of the central analysis device (110) to detect a fire or a fire emergence or is assigned to the respective local detector module(s) (320) to localize a fire or a fire emergence.

12. The method according to claim 11,
characterized in that
a fire or a fire emergence is detected if the scattered light captured by at least one local detector module (320) and transmitted to the central analysis device (110) exceeds an alarm threshold ($AS_i$) stored there.

13. The method according to claim 11,
characterized in that
the captured and transmitted scattered light or transmitted light is assigned to the respective local detector module(s) (320) by correlating a data set or data model (403) of dilution ratios ($V_i$) set for the respective local detector modules (320), which data set or data model (403) is stored in the central analysis device (110), with the transmitted scattered light or transmitted light.

14. The method according to claim 11,
characterized in that
each of the amount of test fluids removed from the one or more monitored areas (i) flows through a central scattered light detector module (112) as a test fluid flow (211), and the scattered light captured by the central scattered light detector module (112) is compared with the scattered light or transmitted light captured by the one or more local detector modules (320).

15. The method according to claim 11,
characterized in that
test particles forming a test aerosol, are released in one or more of the monitored areas (i) or in the vicinity of one or more suction openings (220), the local detector modules (320) in the third step (C) capturing the scattered light scattered at the test particles or the transmitted light passing through the test particles.

\* \* \* \* \*